June 26, 1951 E. WILDHABER 2,558,203
CLUTCH TOOTH
Filed Aug. 4, 1945 2 Sheets-Sheet 1
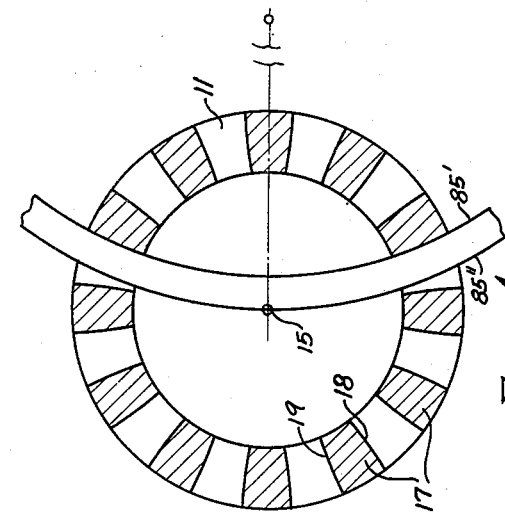
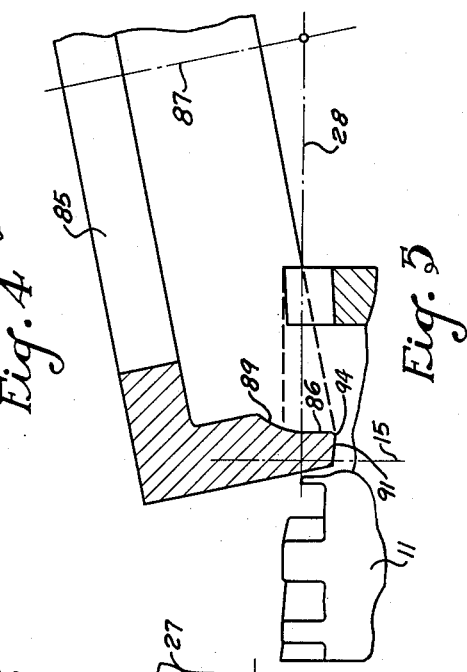
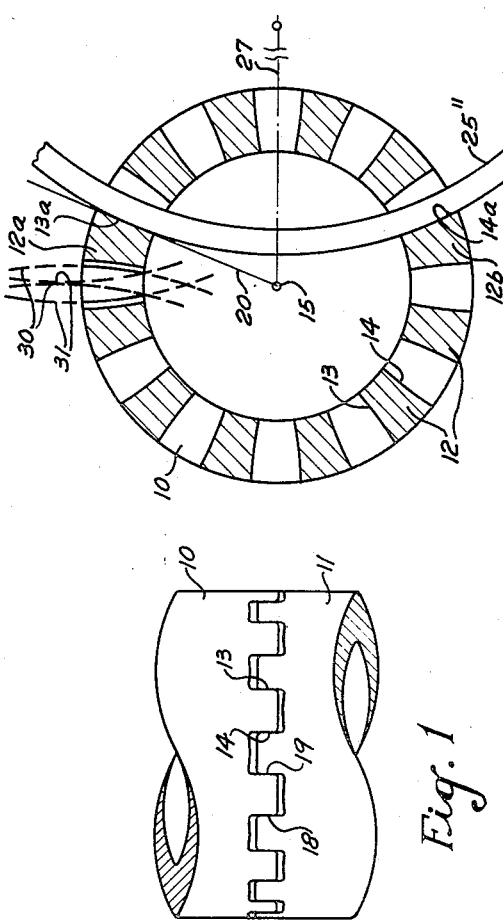
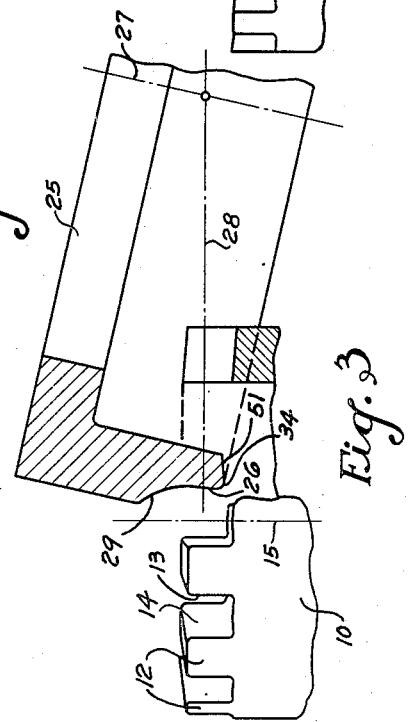
INVENTOR.
ERNEST WILDHABER
BY June 26, 1951  E. WILDHABER  2,558,203
CLUTCH TOOTH Filed Aug. 4, 1945  2 Sheets-Sheet 2

ERNEST WILDHABER
INVENTOR.

BY

Patented June 26, 1951

2,558,203

UNITED STATES PATENT OFFICE 2,558,203

CLUTCH TOOTH

Ernest Wildhaber, Brighton, N. Y., assignor to Gleason Works, Rochester, N. Y., a corporation of New York Application August 4, 1945, Serial No. 608,853

5 Claims. (Cl. 192—108)

The present invention relates to toothed face members such as couplings and clutches, and to methods of producing the same. In some aspects the invention constitutes an improvement over the invention of my copending applications Serial Nos. 444,031 and 520,463, filed May 22, 1942, and January 31, 1944, respectively, now Patents Nos. 2,384,582 and 2,427,641, respectively, granted September 11, 1945, and September 16, 1947, respectively.

In my prior applications, a method is disclosed for producing toothed face clutches and couplings in which a face mill cutter is so positioned as to operate simultaneously in two spaced tooth zones of a coupling or clutch member and cut simultaneously opposite sides of spaced teeth of the work. The cutting operation is performed by rotating the cutter on its axis and effecting a relative depthwise feed movement between the cutter and work in the direction of tooth depth. When the cutter reaches full depth position, opposite sides of a pair of spaced teeth of the work will be finished. The cutter is then withdrawn from engagement with the work, and the work indexed. Then the feed movement is begun anew to cause the cutter to finish opposite sides of another pair of spaced teeth. The two sides of each tooth space of the work are cut, therefore, in separate cycles, one side and part of the bottom of a tooth space being cut when the tooth space is in one zone of cut and the opposite side and the rest of the bottom of the tooth space being cut when the tooth space is in the other zone of cut. The cutter is so positioned relative to the work as to cut tooth spaces on the work which are of greater width at their outer ends than at their inner ends. In most cases, also, the cutting blades are made with rounded corners at the junctures of their side and tip cutting edges so as to produce rounds in the tooth spaces at the juncture of the sides and bottoms of the tooth spaces for greater tooth strength. The tip-cutting edges of the cutter are so inclined to the side-cutting edges of the cutter as to have the purpose of producing bottoms in the finished tooth spaces which are single surfaces, for instance, plane or conical surfaces, and in order to be certain of completely cutting the bottoms of the tooth spaces, the tip-cutting edges of the cutter have been made of such width that the two cuts taken in a tooth space overlap somewhat all along the tooth space.

It has been found in practice that couplings and clutches produced in this way have scratches in the bottoms of the tooth spaces in the area of overlap of the two cuts. In the bottoms of some of the tooth spaces, the first cut predominates and in the bottoms of other tooth spaces the second cut predominates. The predominance of one cut over the other is probably due to the fact that the angle through which the work has to be indexed to effect the two cuts in a tooth space causes even the slightest inaccuracy in the mounting of the cutter or of the work to be magnified, and, moreover, different reactions to elastic deflections occur during the two cuts, even though very slight. The predominance of one cut over the other not only gives a bad appearance to the clutch or coupling member, but, where one cut is slightly deeper than the other, a gouge is produced. This is a serious objection, because a gouge is always an incipient source of cracks, and cracks are dangerous especially where the clutch or coupling is heavily loaded as is the case in aeronautical installations.

Further than this, with prior construction and prior methods of production the face width of the work, that is, the length of its teeth is definitely limited especially in cases where rounds are formed at the junctures of the sides and bottoms of the tooth spaces. This is because the tip-cutting edge of the tool always has to be made of sufficient width to cut half of the large end of the tooth space plus some overlap, and if the tooth space is too long then the tip-cutting edge will interfere, at the small end of the tooth space, with the round formed on the side of the tooth space opposite to the side being cut.

The present invention has for its primary objects to provide a structure for toothed face clutch and coupling members, and a method for producing such members, through which such members can be cut without danger of gouging the bottoms of the tooth spaces and through which clutch or coupling members of much greater tooth length than cut heretofore may be cut with rounds at the junctures of the sides and bottoms of the tooth spaces.

Other objects of the invention will be apparent hereinafter from the specification and from the recital of the appended claims.

In the drawings:

Fig. 1 is a fragmentary elevational view of a pair of coupling members made according to one embodiment of this invention;

Fig. 2 is a sectional view showing one of the coupling members in section in the pitch plane and illustrating the method of cutting this coupling member;

Fig. 3 is a part elevational, part sectional view taken at right angles to Fig. 2, and further illustrating the structure of this coupling member and the method of cutting it;

Figs. 4 and 5 are views, corresponding to Figs. 2 and 3, respectively, and illustrating the structure and one method of cutting the mating coupling member;

Figure 9:
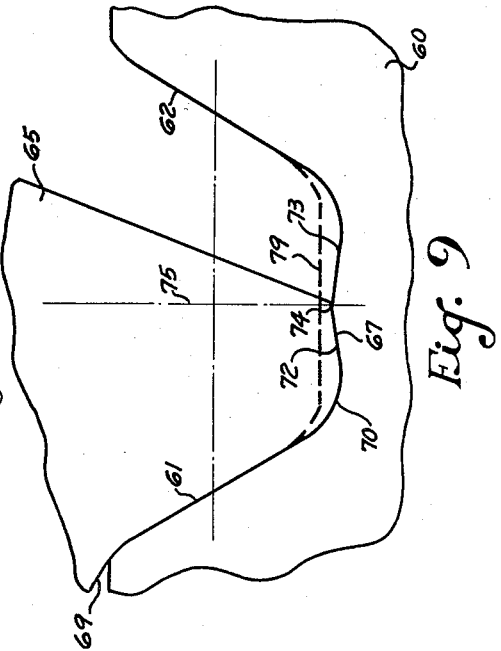
Figure 8:
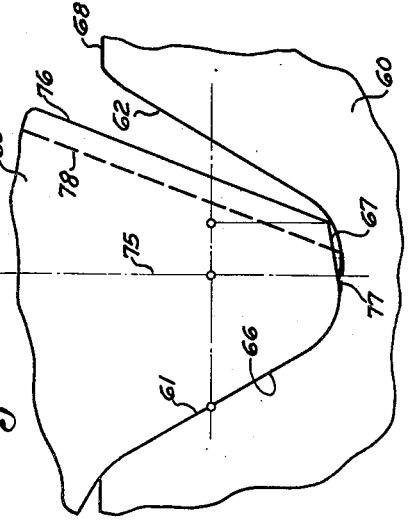

Fig. 8 is a diagrammatic view illustrating the cutting of a coupling member constructed according to another embodiment of the invention and showing particularly the relation of the cutter and the work during the cutting of one side of a tooth space of this member at the inner end thereof; and Fig. 9 is a similar view showing the relation of the cutter and the work during cutting at the outer end of this same side of the tooth space of the work.

In Figs. 1 to 7 inclusive, 10 and 11 denote the two members of a coupling made according to one embodiment of this invention. The teeth 12 of the member 10 have opposite side tooth surfaces 13 and 14 which are longitudinally concave and which are of zero pressure angle, that is, extend in the direction of the axis 15 of the coupling. The teeth 17 of the member 11 have opposite side tooth surfaces 18 and 19 which are longitudinally convex, but which, like the sides of the teeth of the member 10, are of zero pressure angle, extending in the direction of the axis 15 of the coupling. The teeth and tooth spaces of both members extend generally radially of the clutch axis 15, the sides of the teeth being radial of the axis 15 at mean points in their length. Thus, a side 13a of clutch member 10 is tangent, at a mean point in the length of the tooth side, to line 20 drawn radial of the clutch axis 15.

The tooth surfaces of the two members 10 and 11 may be cut according to the basic principles disclosed in my applications above mentioned. For cutting the sides and bottoms of the tooth spaces of the coupling member 10, a face mill cutter or annular grinding wheel 25 is employed that has outside cutting edges 26 and tip-cutting edges 51, and for cutting the sides and bottoms of the tooth spaces of the coupling member 11, a face mill cutter or grinding wheel 85 is employed that has inside cutting edges 86 and tip-cutting edges 91. Each cutter is positioned to operate simultaneously in two spaced tooth zones of the work and cut simultaneously opposite sides of spaced teeth of the work as the cutter is rotated in engagement with the work and simultaneously fed into depth.

In the instance shown, the outside cutting edges 26 of tool 25 are of positive pressure angle, and axis of the tool is inclined inwardly with reference to the pitch plane 28 of the coupling member 10 so that the tool will produce side tooth surfaces 13 and 14 on the teeth 12 of the work which are of zero pressure angle. Similarly, the tool 85 has inside cutting edges 86 which are of positive pressure angle and the tool is tilted outwardly with reference to the work so that its axis 87 is inclined to pitch plane 28 at the angle required to produce side tooth surfaces on the work which are of zero pressure angle.

Figure 7:
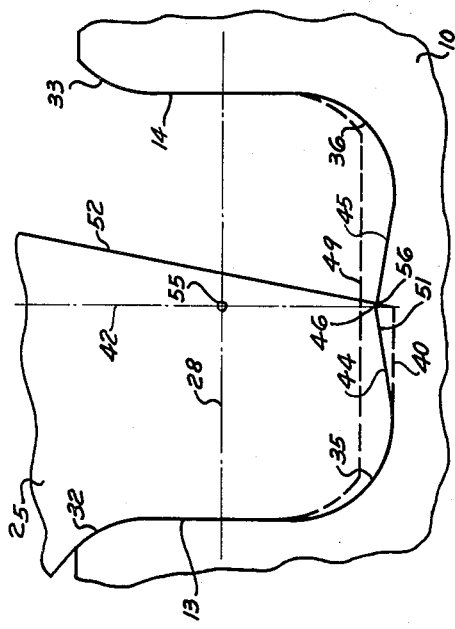
Fig. 7 is a similar view but showing the relative positions of the cutter and the work during the cutting of the large end of this tooth space.

In the embodiment of the invention shown, the sides of the teeth of both coupling members are rounded at their junctures with the tips of the teeth. Thus, the opposite sides of the teeth of coupling member 10 are rounded at 32 and 33 as illustrated in Fig. 7. To produce these rounds, the outside surface of tool 25 is rounded at the point where the side-cutting edge or side-cutting surface of the tool joins the body of the tool, as denoted at 29. Likewise, tool 85 is rounded at 89.

Figure 6:
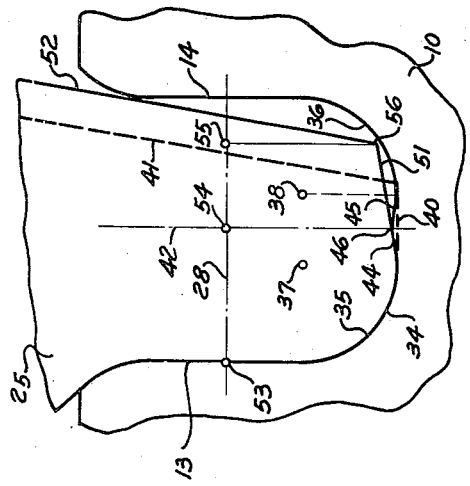
Fig. 6 is a diagrammatic view on an enlarged scale further illustrating the invention and showing particularly the relative positions of the cutter and the work at the inner end of a tooth space of the work during cutting of one side of the tooth space of the coupling member shown in Figs. 2 and 3.

To produce the rounds desired at the junctures of the sides of the teeth and the bottoms of the tooth spaces, the cutting tool will have a corresponding round formed at the juncture of its side and tip-cutting edges. Thus, as shown in Figs. 6 and 7 rounds 35 and 36, respectively, are provided on the coupling member 10 at the junctures of opposite sides 13 and 14 of its teeth and the bottom of its tooth spaces. These rounds are of circular arcuate shape and in the section of Fig. 6 have their centers at 37 and 38, respectively. The tool 25 accordingly has a round 34 formed at the juncture of its side and tip-cutting edges whose radius is equal to the radius of the rounds 35 and 36 to be produced. The tool 85 is formed with a corresponding round 94 at the juncture of its inside cutting edge or edges 86 and its tip cutting edge or edges 91.

The path of travel of the tip of the tool 25 in the cutting of opposite side tooth surfaces 13a and 14a of spaced teeth 12a and 12b of the member 10 is denoted by lines 25' and 25'' in Fig. 2 while the path of travel of the tip of tool 85 in the cutting of a pair of opposite side tooth surfaces of spaced teeth of coupling member 11 is denoted by lines 85' and 85'' in Fig. 4. In either case, when a pair of tooth sides have been cut, the tool is withdrawn from engagement with the work and the work indexed. Then opposite sides of another pair of spaced teeth is cut. As the work is indexed around, the tool will take two cuts in each tooth space, one during the cutting of one side of the tooth space and the other in the cutting of the opposite side of that tooth space.

The dotted lines 30 in Fig. 2 indicate the path of the tool in the cutting of one side of one of the tooth spaces of coupling member 10 and the dotted lines 31 denote the path of the tool in the cutting of the opposite side of that same tooth space. These two cutting paths have to overlap, otherwise the bottom of the tooth space would not be finished across its whole width especially at the large or outer end of the tooth space.

It has always been the aim heretofore to produce tooth space bottoms which are single, smooth, uninterrupted surfaces. Due to the two cuts taken in the bottoms of the tooth spaces, however, and the overlap of these cuts, and the slight inaccuracies that can always occur in machines and their settings, this has been found virtually impossible. Whether it was the intention to produce tooth bottoms that were plane or were conical, one cut seems always to predominate the other in each tooth space bottom and cause a gouge.

Where it has been desired to produce teeth which are well rounded at the junctures of their sides with the bottoms of the tooth spaces, as is shown on large scale in Figs. 6 and 7, still further difficulties have been encountered. In cutting a tooth space of the clutch member 10 according to prior practice, a cutting tool would be employed whose tip-cutting edge in full depth position would occupy the position denoted in dotted lines at 40 in Figs. 6 and 7, and the cut taken by the tip-cutting edge 40 of the tool would be plane or conical depending upon whether the tip-cutting edge 40 was inclined at right angles or at other than right angles to the axis of the cutter. To produce the round 35 at one side of the tooth space and a plane or conical bottom land and avoid having the tip-cutting edge 40 cut into the round 36 at the opposite side of the tooth space at the small end of the tooth space, the right hand end of the cutting profile of the tool had to begin at or but slightly beyond the projection of the point 38 to the tooth space bottom at the small end of the tooth space. That is, with prior practice the right hand side of the cutting profile had to extend along some line such as the line 41, close to the projection of point 38 to the tip-cutting edge 40. The line 41, however, extends only a moderate distance beyond the center line 42 of the tooth space. This means that with prior practice couplings or clutches of short face width only could be produced, since if the length of teeth from end to end was such that the width of the tooth spaces at their outside ends was greater than twice the width of the tip-cutting edge 40 of the tool, the bottoms of the tooth spaces could not be finished for their full width at the outer ends of the tooth spaces, and a separate operation would be required to complete the bottoms of the tooth spaces.

The difficulties previously encountered are overcome with the present invention by making the bottoms of the tooth spaces of ridge or roof shape, instead of trying to make them a single plane or a single conical surface as was previously attempted. Thus, as clearly shown in Figs. 6 and 7, the bottoms of the tooth spaces of coupling member 10 are made up of two surfaces 44 and 45 which are inclined to one another and which join in a line 46 which extends longitudinally of the tooth space substantially centrally thereof. The bottoms of the tooth spaces, in other words are of V-shape in cross-section. The two parts of the bottom of a tooth space meet at an angle which differs from one hundred and eighty degrees by more than five degrees and which may be as high as twenty degrees, that is, each of the two sides 44 and 45 of the bottom of the tooth space may be inclined to a plane by as much as ten degrees per side.

To cut tooth spaces according to this invention, the cutter used has its tip-cutting edge or edges so inclined to its side-cutting edge as to form the portions of the tooth bottom at the desired angle as the cutter revolves in engagement with the work at full depth. Thus, tip-cutting edge 51 of cutter 25 will be inclined to its side-cutting edge 26 at the angle required to produce bottom portions 44 and 45 in the tooth spaces of the work, in the two cuts taken in each tooth space, which will be inclined to one another at the desired angle. Due to the inclination of the tip-cutting edge 51 of the cutter, the tip-cutting edge can be made of much greater width than the tip-cutting edges of cutters heretofore employed. Thus, as shown in Figs. 6 and 7, tip-cutting edge 51 can be made of such width that the right-hand side of the operating portion of the tool may be at 52, instead of at 41, and, at the inner end of the tooth space, just clear the side of the tooth space opposite to the side on which the cut is being taken. The tip-cutting edge 51 has simply to be inclined sufficiently to avoid cutting into the round 36 formed at the opposite side 14 of the tooth space. It will be obvious that with the present invention couplings or clutches of much greater face width can be cut than with prior practice, for with the present invention the tip-cutting edge 51 of the cutter can cut up to the center line 42 of the tooth space at the large end of the tooth space, as shown in Fig. 7, and the length of the tooth space can be longer because of the increased width of space that can be cut at the outer end of the space.

In Figs. 6 and 7, the pitch line 28 is shown at a distance from the top of the teeth equal to half the working depth. It intersects the side profile 13 at a point 53 in Fig. 6 and the center line 42 of the tooth space at point 54. 55 denotes the projection of the right-hand end point of the tip-cutting edge 51 to the pitch line. The width of the tooth space at the small end equals twice the distance 53—54. If the tool 25 has the cutting edge 51 shown, a tooth space can be produced which at its outer end has a width equal to twice the distance 53—55 measured at the pitch line of the tooth space, as shown in Fig. 7. The outside width of a tooth space and the inside width of the tooth space are then substantially in the proportion of the distances 53—55 and 53—54, which is quite acceptable.

When clutch or coupling members are cut according to the present invention, the cut in the bottom of the tooth space at one side of the tooth space clears the cut at the other side of the tooth space and the two cuts join at the substantially centrally located ridge. Hence, there are not scratches or gouges formed in the bottom of the tooth space by reason of one cut being taken at a slightly different height from the other, and a longer tooth can be cut than in prior practice without an added operation.

The present invention may be practiced, of course, in the cutting of various types of clutches and couplings and is by no means confined to the cutting of clutches or couplings having side tooth surfaces of zero pressure angle. Thus, as shown in Figs. 8 and 9, the present invention may be used with advantage in the cutting of a clutch or coupling member 60 whose opposite side tooth surfaces 61 and 62 are of positive pressure angle. Here a tool 65 is employed whose side-cutting edge 66 is also of positive pressure angle. The tip-cutting edge of this tool is denoted at 67. In the embodiment shown, the sides of the teeth of the clutch or coupling member are rounded off at their junctures with the tips 68 of the teeth and with the bottoms of the tooth spaces. Accordingly, the cutting profile of the tool is so formed that it has a rounded cutting edge 69 between the side-cutting edge 66 and the body of the tool and a rounded cutting edge 70 joining the side-cutting edge 66 and the tip-cutting edge 67. Thus the necessary rounds will be formed on the teeth of the work. As in the previously described embodiment of the invention, the tip-cutting edge 67 is inclined to the side-cutting edge 66 at such an angle as to produce bottom portions 72 and 73 in the bottoms of the tooth spaces which are inclined to one another and form a ridge 74 lying substantially in the center line 75 of the tooth space. Again the tool can have a tip-cutting edge of greater width than previously used with its right-hand side positioned at 76 rather than at 78 which would be the limit position for a tool built according to previous practice and having its tip-cutting edge at 77. The result is that a tooth space of greater length can be cut.

In Figs. 7 and 9, 49 and 79 denote, respectively, the position of the top of a tooth of the mating coupling member and show that the ridge formed in the bottom of the tooth space of one coupling member does not interfere with the tip of the tooth of the mating clutch or coupling member.

Moreover, while the invention has been described in connection with the toothed members whose tooth sides are longitudinally curved, it will be obvious that it may be applied also to toothed members whose tooth sides are longitudinally straight. For instance, it may be used on face coupling or clutch members having side tooth surfaces which are straight and radial of the coupling or clutch axis.

Still further, the invention is not confined to use in operations where the two portions of the bottoms of the tooth spaces are cut in one operation, but may be employed where one side of all of the teeth and tooth space bottoms are cut in one operation and the opposite sides of the teeth and tooth space bottoms are cut in a separate operation.

Throughout the specification and claims wherever the terms "cutter" or "cutting" are used, it will be understood that they may include grinding wheels and grinding, for a grinding wheel is a cutter with an infinite number of cutting edges.

In general, it may be said while the invention has been described in connection with several different embodiments thereof, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A toothed face member having teeth and intervening tooth spaces, said tooth spaces being of greater width at one end than at the other, the bottoms of the tooth spaces at any point along their lengths being of inverted V-shape in cross section and each comprising two portions that are inclined upwardly from the opposite sides of a tooth space and that intersect in a line which extends longitudinally of the tooth space between the opposite sides thereof.

2. A toothed face member having teeth and intervening tooth spaces, the bottom of each tooth space being of substantial width and comprising two portions that are inclined upwardly from the opposite sides of the tooth space and that intersect in a line which extends longitudinally of the tooth space between the opposite sides thereof.

3. A toothed face member having teeth and intervening tooth spaces, the sides of the teeth, which bound a tooth space, being longitudinally curved about different centers, the bottom of each tooth space being formed of two portions which are inclined to one another and which intersect in a line that forms a ridge extending along the length of the tooth space from one end thereof to the other, and each tooth space being of less width at its inner end than at its outer end.

4. A toothed face member having teeth and intervening tooth spaces, the sides of the teeth being longitudinally curved, opposite sides of spaced teeth lying in a common surface of revolution, the bottom of each tooth space being formed of two portions which are inclined to one another and which intersect in a line that forms a ridge extending longitudinally of the tooth space and substantially centrally thereof from one end of the tooth space to the other, and each tooth space being of less width at its inner end than at its outer end.

5. A toothed face member having alternating teeth and tooth spaces with fillet curves formed at the junctures of the sides of the teeth and the bottoms of the tooth spaces, the bottoms of the tooth spaces being of greater width at one end than at the other and being of inverted V-shape in cross section along their lengths, each of said bottoms comprising two portions that are inclined upwardly from opposite sides of the tooth space and that intersect in a line which extends longitudinally of the tooth space between the opposite sides thereof.

ERNEST WILDHABER.

REFERENCES CITED

The following references are of record in the file of this patent:

UNITED STATES PATENTS

| Number | Name | Date |
|---|---|---|
| 436,324 | Trask | Sept. 9, 1890 |
| 466,923 | Price | Jan. 12, 1892 |
| 558,372 | Errington | Apr. 14, 1896 |
| 767,364 | Rathbun et al. | Aug. 9, 1904 |
| 1,163,085 | Hardy | Dec. 7, 1915 |
| 1,380,286 | Anderson | May 31, 1921 |
| 1,532,564 | Von Soden-Fraunhofen | Apr. 7, 1925 |
| 2,181,242 | Kurzina | Nov. 28, 1939 |
| 2,334,366 | Wildhaber | Nov. 16, 1943 |
| 2,384,582 | Wildhaber | Sept. 11, 1945 |
| 2,394,222 | Wildhaber | Feb. 5, 1946 |

FOREIGN PATENTS

| Number | Country | Date |
|---|---|---|
| 746,452 | France | Mar. 7, 1933 |